United States Patent
Mercuri

(10) Patent No.: US 7,247,359 B1
(45) Date of Patent: Jul. 24, 2007

(54) MEAT PRODUCT CASING HAVING A MAXIMUM EXTENSIBLE DIAMETER

(75) Inventor: Gervasio Mercuri, Glynde (AU)

(73) Assignee: Ennio Pty Ltd, Glynde (AU)

( * ) Notice: Subject to any disclaimer, the term of this patent is extended or adjusted under 35 U.S.C. 154(b) by 723 days.

(21) Appl. No.: 09/869,094

(22) PCT Filed: Dec. 23, 1999

(86) PCT No.: PCT/AU99/01141

§ 371 (c)(1),
(2), (4) Date: Sep. 18, 2001

(87) PCT Pub. No.: WO00/38531

PCT Pub. Date: Jul. 6, 2000

(30) Foreign Application Priority Data

Dec. 23, 1998 (AU) .................... PP7901

(51) Int. Cl.
  *B29D 22/00* (2006.01)
(52) U.S. Cl. ............... 428/34.8; 428/36.1; 138/118.1; 138/123
(58) Field of Classification Search ............. 428/34.8, 428/36.1; 138/118.1, 123, 124; 66/201, 66/202

See application file for complete search history.

(56) References Cited

U.S. PATENT DOCUMENTS

| | | | | |
|---|---|---|---|---|
| 1,518,798 A | * | 12/1924 | Kendrick | .................. 66/190 |
| 3,178,910 A | * | 4/1965 | Hammerle | .................. 66/170 |
| 3,248,905 A | * | 5/1966 | Krauss et al. | .................. 66/192 |
| 3,251,201 A | * | 5/1966 | Newman | .................. 66/192 |
| 3,513,668 A | * | 5/1970 | Mintz | .................. 66/193 |
| 3,866,444 A | * | 2/1975 | Levin | .................. 66/195 |
| 4,036,037 A | * | 7/1977 | Huckfeldt | .................. 66/170 |
| 5,413,148 A | * | 5/1995 | Mintz et al. | .............. 138/118.1 |
| 5,712,007 A | * | 1/1998 | Mercuri | .................. 428/34.8 |
| 5,855,231 A | * | 1/1999 | Mintz | .............. 138/118.1 |
| 5,868,612 A | * | 2/1999 | Mercuri | .................. 452/32 |

FOREIGN PATENT DOCUMENTS

| | | |
|---|---|---|
| AU | 7666981 | 4/1983 |
| AU | 4612393 | 2/1993 |
| WO | 9205302 | 4/1992 |
| WO | 9601565 | 1/1996 |
| WO | 9613626 | 5/1996 |
| WO | 9911136 | 3/1999 |

* cited by examiner

Primary Examiner—Alicia Chevalier
(74) Attorney, Agent, or Firm—Crowell & Moring LLP

(57) ABSTRACT

A tubular casing for use with food products which includes knitted stockinette, longitudinal threads and circumferential spiral threads that are held to stockinette by stitches located along the length of the casing. Each thread comprises an elastic thread formed from an inextensible yarn spirally wrapped around the outside of a rubber thread. As thread is stretched, the rubber thread extends and the helix angle of the spirally wrapped yarn reduces to the point where the yarn approximates a straight line. The inextensible yarn resists further stretching beyond this point. This point is the elastic limit for thread and it can be adjusted by varying the helix angle during manufacture of the elastic thread. Threads therefore allow the casing to be filed to a predetermined maximum diameter and result in the filled casing having a constant diameter throughout its length.

22 Claims, 3 Drawing Sheets

MEAT PRODUCT CASING HAVING A MAXIMUM EXTENSIBLE DIAMETER

BACKGROUND AND SUMMARY OF THE INVENTION

This invention relates to a tubular product such as a tubular casing, and in particular to a tubular casing having a predetermined maximum extensible diameter.

The main application for tubular products such as tubular casing of the variety described in this specification is in the food industry. However, the invention is not restricted to this particular application. Tubular products such as knitted netting or elasticated knitted fabric casing are used in the cooking and curing process of meat products. In the cooking of certain meat products, it is common to pack the meat pieces into an elasticated tubular net. The tubular net compresses the meat pieces and holds them together during the cooking process.

Such tubular products are normally removed from cooked meat products which can then be further packaged, ready for sale. Elasticated tubular casing is also used on cured meat products such as ham and metwurst.

The means of filling tubular casing normally comprises fitting the casing onto a hollow cylindrical mandrill, which is known as a stuffing tube, and using a machine to pump or force meat product under pressure through the stuffing tube into the casing. The casing is drawn from the stuffing tube as the meat product is extruded out of the stuffing tube. The process is started by first clipping the end of a casing once sufficient casing is placed on the stuffing tube. Further clips are placed at intervals dependent on the required length of the product.

Such machines can be used either with minced meat products, meat portions or whole meat muscle.

It is difficult to maintain a constant diameter of the resultant product as the casing is being filled. Tubular product that is commonly used such as tubular netting is able to expand to very large diameters. The required diameter is normally achieved by controlling the pressure at which meat product is pumped through the stuffing tube. However, it is still possible to produce a filled casing that varies considerably in diameter. This is quite undesirable as many of the compressed meat products are normally sliced at the time of purchase. Therefore, it is desirable to ensure a constant diameter and to also not exceed certain diameters which would be unsuitable for some slicing machines. Clearly, a product of uniform diameter is more visually appealing and avoids wastage and reworking of product at the manufacturing stage.

Accordingly, it is an aim of the invention to provide a tubular casing which resists expansion beyond a required or preset diameter.

In its broadest form, the invention is a tubular casing for use with food product that includes, circumferential threads along the length of said tubular casing that become taunt at a preset diameter so that said tubular casing has a predetermined diameter when filled with food products.

Preferably, the circumferential threads may comprise either elasticated threads or inextensible threads.

In the case of inextensible threads, the threads may be incorporated into either a net or netted stockinette so that, at a relaxed diameter, the circumferential threads lie loosely on the surface of the net or stockinette. However, at the preset filled diameter of the casing, the threads become taunt and prevent further expansion of the net or stockinette. In the case of elastic circumferential threads, the elastic threads are provided with an elastic limit where, below the elastic limit the threads remain extensible, and that at the elastic limit, the threads become inextensible.

Elasticated thread is normally a combination of rubber thread or strips with natural or synthetic yarns wrapped around the length of the rubber. A large number of turns of yarn per centimeter of rubber is normally used to cover the rubber surface. Elasticated threads formed in this way have more than adequate extensibility. In fact, the elasticated threads remain extensible well beyond the desired maximum diameter of the product being produced which allows bulging to readily occur.

In a further aspect of this invention, elastic thread is provided with an elastic limit by controlling the rate at which yarn is wrapped onto the external surface of the rubber thread. It has been found that the elastic limit can be set by controlling the number of turns of yarn per centimeter of elastic thread.

The yarn forms a helix or spiral around and along the length of the rubber thread. As the elastic thread is stretched, the helix or spiral expands so that the helix angle increases thereby enabling stretching of the rubber. At the same time, the diameter of the helix or spiral reduces. If the number of turns of yarn per centimeter on the elastic thread is limited, then the lengthwise expansion of the helix and its continual reduction in diameter will result in a limit being reached whereby further tensile force applied to the elastic thread is resisted by the yarn. This occurs when the yarn helix effectively approximates a straight piece of thread where stretching force results in only tensile force within the yarn. Although the yarn wrapped around the rubber thread does not completely straighten, it will reach a point where the helix is unable to straighten any further, and therefore approximates a straight length of thread.

Once the tensile force is resisted by the yarn, the elastic thread will not be able to stretch. The elastic thread is then effectively inextensible. That is, further force applied to thread will not result in any additional stretch or extension.

The elastic limit is determined by the number of turns of yarn per centimeter around the rubber thread. The limit can therefore be predetermined, and as such tubular casing using elasticated thread can be produced which will have a maximum diameter to which it can expand.

A typical method for manufacturing tubular casing is by circular knitting machines. Typical casings are single knit jersey tubes which may incorporate circumferential and longitudinal threads. The circumferential threads normally comprise a single thread that forms a spiral that extends along the length of the tubular casing.

In addition, circular knitting machines may be used to produce tubular netting which comprises longitudinal and circumferential thread members. Again, the circumferential thread forms a continuous spiral along the length of the tubular casing. The longitudinal stitches are spaced at regular intervals around the circumference of the casing.

Accordingly, the invention may be utilised in respect of stockinette casings incorporating inextensible or elastic threads as circumferential members. Also, the invention may be used with net casing products where either inextensible or elastic threads according to the invention are used.

In addition, the invention may also be a tubular casing which is a combination of a net and fibrous casings. The fibrous casing is located within and extends along the length of the net casing. Preferably, the diameter of the fibrous casing greatly exceeds the diameter of the net casing in its relaxed form. This ensures, in the case of a net having elastic circumferential threads, that a constant compressive force is applied to meat product as it is forced into the tubular casing.

Preferably, the stuffing process results in embedding of circumferential and longitudinal threads into the surface of the meat product once the maximum diameter is reached. This will serve to produce a pattern on the surface of the meat product once the casing is removed. In the case of a combination of net and fibrous casing, the maximum diameter of the net is slightly less than the maximum diameter of the fibrous casing to ensure formation of the pattern effect.

BRIEF DESCRIPTION OF THE DRAWINGS

In order to fully understand the invention, preferred embodiments will now be described. However, it should be realised that the invention is not confined or restricted to the precise combination of elements shown in these embodiments. These embodiments are illustrated in the following drawings in which.

DETAILED DESCRIPTION OF THE DRAWINGS

Figure 1:
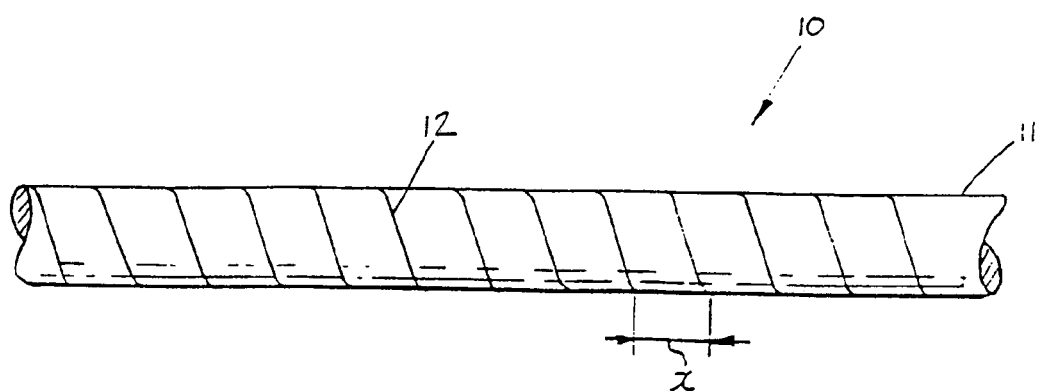
FIG. 1 shows an elastic thread prior to stretching.
Figure 2:
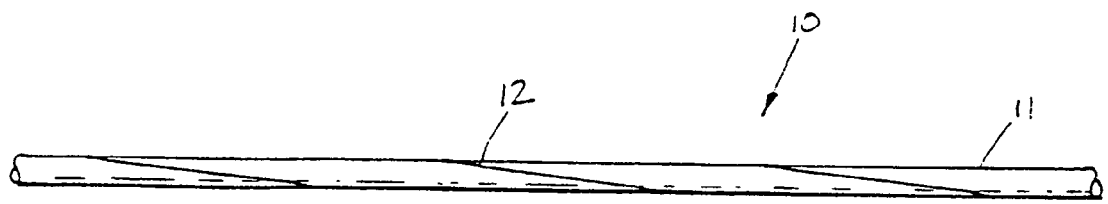
FIG. 2 shows a stretched elastic thread at its elastic limit.

FIGS. 1 and 2 represent schematically the elastic thread 10. It is shown in FIG. 1 in its relaxed form and in FIG. 2 at the elastic limit of stretchability. The elastic thread 10 comprises a rubber thread 11 which has yarn 12 wrapped around its external surface in a spiral or helix.

The dimension X shown in FIG. 1 is the distance between the turns of yarn 12 along the length of the rubber thread 11. As the elastic thread 10 is stretched, the dimension X increases. The same time, the diameter of the rubber thread 11 reduces.

The helix angle of the yarn 12 increases until it reaches a point shown in FIG. 2 where further stretching force is resisted as a pure tensile load within the yarn 12. This results from the helix angle being so small that the compressive force applied to the rubber thread 11 reduces to such a point that it is easily resisted by the rubber thread 11. At this point, the yarn 12 approximates a straight line as all of the further stretching force is resisted by the yarn 12. Accordingly, the yarn 12 which is substantially inextensible resists any further stretching even though the rubber thread 11 may not be at its elastic limit.

At this point, the elastic thread 10 has reached an elastic limit and becomes effectively inextensible. The point at which this elastic limit is reached, is dependent on the number of turns of yarn 12 for any given interval. The degree of extension can be determined by easy experimentation. For example, a single strand of rubber thread 11 having a 1 mm diameter and approximately 9 turns of yarn 12 per centimeter that is knit into a tubular net having a relaxed diameter of approximately 12 centimeters, will allow the net to expand to a maximum diameter of approximately 20 centimeters. In this example, the net is able to expand an additional 8 centimeters before reaching its maximum diameter. This enables the elasticated net to be pulled onto a stuffing tube which has a diameter of 17 centimeters. It will result in a meat product having a maximum diameter of 20 centimeters and bulging will be resisted beyond this diameter due to reaching the elastic limit of the circumferential elastic threads.

A tubular net or tubular casing using circumferential elastic threads 10 will continue to apply considerable compressive force to meat product within once it reaches its maximum diameter. This compressive force will be maintained even though there may be some further shrinkage of the meat product.

The elastic limit of the elastic thread 10 can be produced in a number of ways. As described above, it is common to wrap yarn 12 in a helix around rubber thread 11. However, other wrapping patterns may be used such as multiple yarns 12 wrapped in different directions, or the use of a rubber material which may itself exhibit inextensibility at a given limit of stretch.

Figure 3:
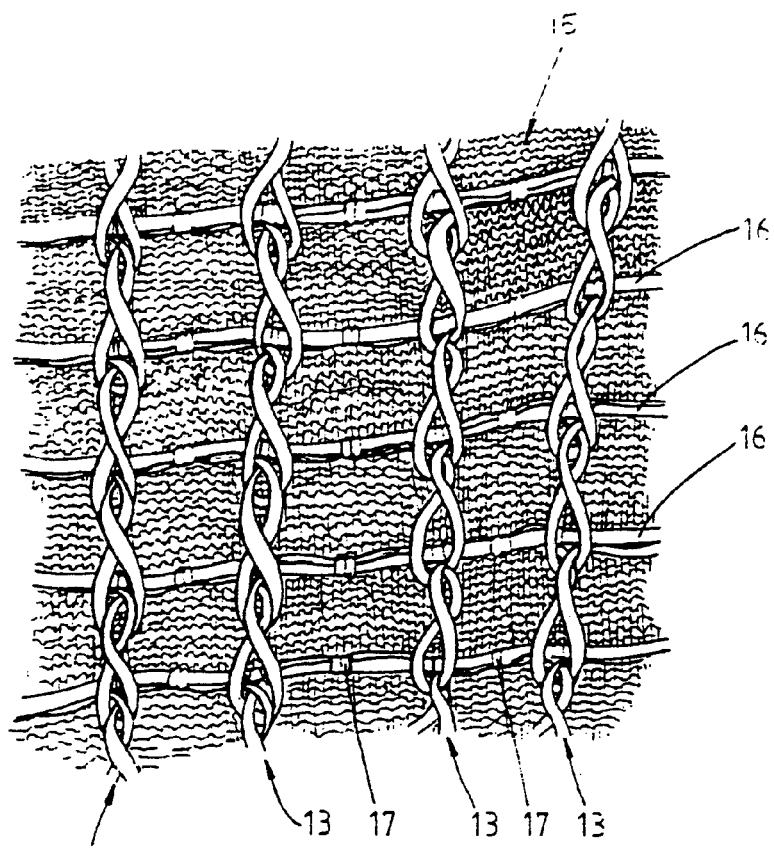
FIG. 3 shows a tubular casing comprising a knitted stockinette in combination with circumferential and longitudinal members.
Figure 4:
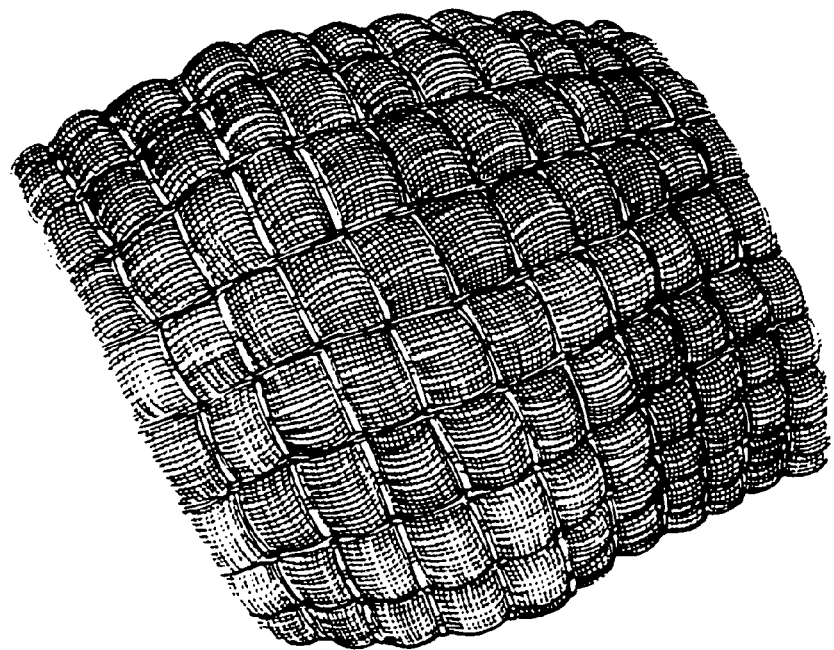
FIG. 4 shows a tubular casing according to FIG. 3 in its filled form.

FIGS. 3 and 4 show a tubular casing comprising longitudinal threads 13 and a circumferential spiral thread, referred to herein as a circumferential thread 16, in combination with a knitted tubular stockinette 15. The circumferential threads 16 are held to the tubular stockinette 15 via tuck stitches 17 and the longitudinal threads 13 comprise knitted loop stitches where a single loop extends from each circumferential thread 16 to loop around the corresponding loop stitch of a lower circumferential thread 16.

The circumferential threads 16 comprises an elastic thread 10 having an elastic limit of stretch. Once the tubular casing shown in FIG. 3 reaches the maximum diameter of the circumferential threads 16, the tubular stockinette 15 remains stretchable, which allows some further expansion within the area bounded by the circumferential and longitudinal threads 16 and 13. This results in a quilted surface pattern which is illustrated in FIG. 4.

The tubular stockinette 15 remains substantially impermeable to meat product that is placed within the tubular casing. This remains the case even though the meat product may be finely minced. Compression applied by the circumferential threads 16 compresses the fibres of the meat product at the surface which tends to seal the surface against any moisture loss. This has a significant advantage in respect of maintaining weight during the cooking or curing process.

As an alternative, the circumferential threads 16 of the embodiment shown in FIG. 3 may comprise inextensible threads which are held to the surface of the tubular stockinette 15 via the tuck stitches 17. These circumferential threads 16 will lie loosely across the surface of the tubular stockinette 15 prior to filling. However, these circumferential threads 16 will limit expansion of the tubular casing to a set diameter and accordingly the expansion of the tubular stockinette 15 will be limited. At this point, some further expansion of the stockinette may occur depending on the pumping pressure of meat product being inserted within the tubular casing. This can result in further expansion of the tubular stockinette 15 with both the longitudinal and circumferential threads 13 and 16 being embedded into the surface of the meat product to again produce a quilted surface pattern shown in FIG. 4.

The tubular casing illustrated in FIGS. 3 and 4 can be continuously produced in a circular knitting machine both for the version using the elastic thread 10 or an inextensible thread. This knitting process results in both the longitudinal and circumferential threads 13 and 16 being located on the external surface of the tubular stockinette 15.

Figure 5:
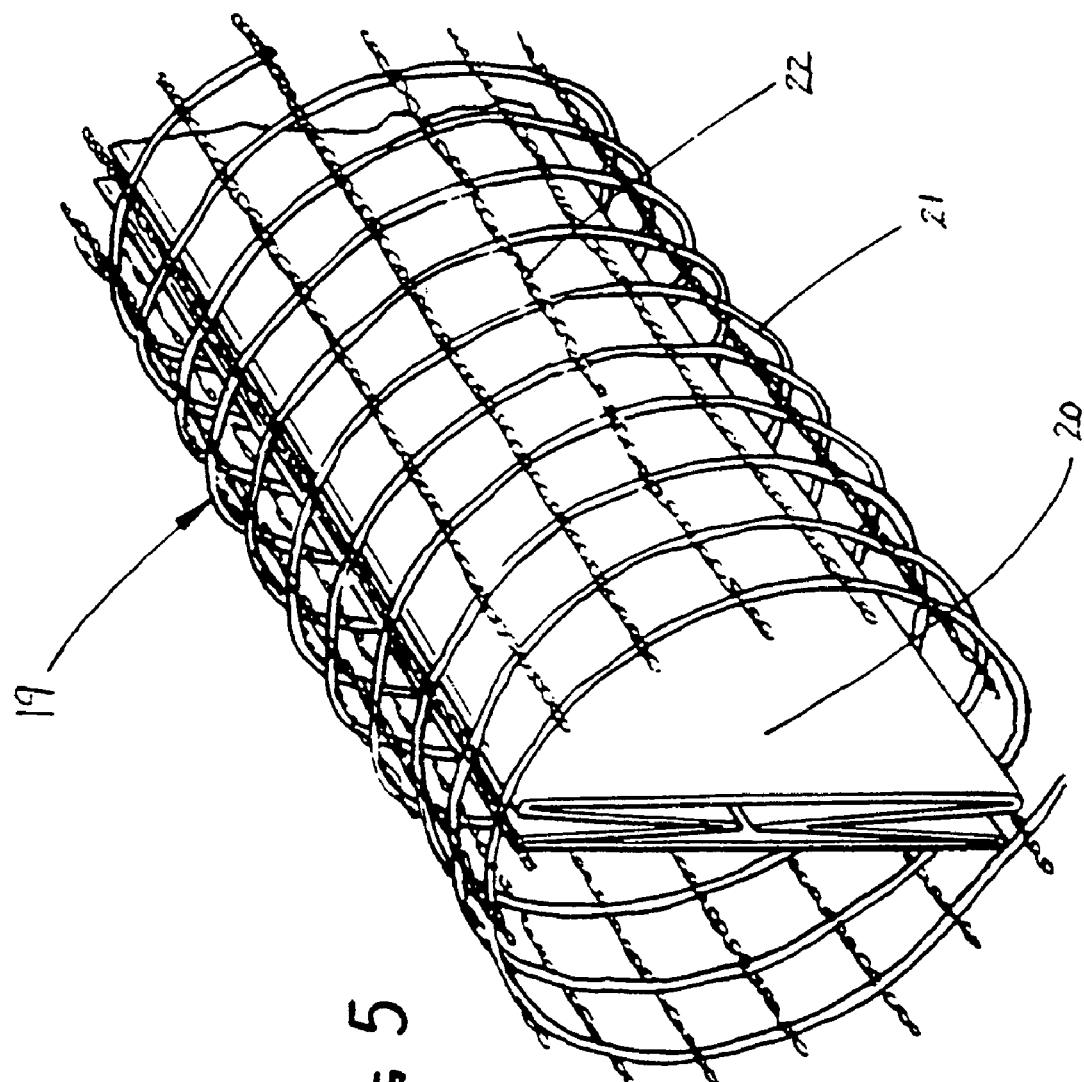
FIG. 5 shows a tubular casing comprising a combination of a net and fibrous casing.

FIG. 5 shows a further embodiment of the invention in which the tubular casing is a combination of a tubular net 19 in combination with a tubular fibrous casing 20. The tubular net comprises a circumferential thread 21 which is a single thread forming spiral along the length of the tubular net 19 and longitudinal threads 22 which each comprise a number of loop stitches to form a continuous longitudinal thread 22.

In this embodiment, the circumferential threads 21 comprise elastic threads 10 having an elastic limit of stretch.

The fibrous casing 20 has an unfilled diameter which exceeds that of the relaxed tubular net 19 by a factor of between 2 and 4. In order to locate the fibrous casing 20 within the tubular net 19, is it folded or pleated as shown in FIG. 5. This ensures that, as the fibrous casing 20 is being filled, the circumferential threads 21 apply a compressive force throughout the filling process.

In this embodiment, the diameter of the fibrous casing 20 is matched to the diameter at which the circumferential threads reach their elastic limit. In this embodiment, the maximum diameter of the tubular net 19 is slightly smaller than the maximum diameter of the fibrous casing 20. This results in a slight embedding of both the circumferential and longitudinal threads 21 and 22 within the surface of the fibrous casing 20. This produces the quilted pattern effect similar to that shown in FIG. 4.

In addition to creating a tubular casing having a predetermined diameter, it would also be possible to produce a controlled variation of diameter along the length of the casing. This is possible in respect of any of the embodiments described above that use the elastic thread 10. In order to achieve this, the rate at which the yarn 12 is wrapped around the elastic threads 11 can be varied so that the elastic limit of the elastic thread 10 also varies. This variation can be produced in a controlled manner so that the maximum diameter of the tubular casing varies along its length.

This process would enable a variety of shapes to be produced. For example, alternating large and small diameter sections are possible along the length of the tubular casing. Even spherical or elliptical shapes are possible so that a traditional shape used for certain meat products such as parma ham can also be produced.

It will be seen from the above description, that the invention will be extremely useful, and will provide a tubular casing which itself can control the maximum diameter of the meat product inserted within.

The invention claimed is:

1. A tubular structure casing for use with food products, comprising:
circumferential threads extending around a periphery of a tubular casing and spaced at intervals along said tubular casing, said circumferential threads comprising an elastic thread in combination with a yarn wrapped around and along a length of said elastic thread, wherein a number of turns of said yarn are provided around said elastic thread for a given length of said circumferential threads are determined as a function of an elastic limit of said elastic thread so that said circumferential threads become taut after a predetermined amount of stretch due to said yarn being straightened to an extent where said yarn resists tensile force whereupon said circumferential threads become inextensible before the elastic limit of said elastic thread is reached.

2. A tubular casing according to claim 1, further comprising a knitted tube with said circumferential threads attached to said knitted tube.

3. A tubular casing according to claim 1, wherein said tubular casing is a tubular net comprising radially spaced longitudinal threads in connection with said circumferential threads and wherein said circumferential threads comprise a continuous thread extending spirally along said tubular casing.

4. A tubular casing according to claim 3, further comprising a tubular fibrous casing located within a co-extensive with said tubular net, said fibrous casing comprising an inner liner for said tubular net.

5. A tubular casing according to claim 4, wherein said circumferential threads become taut at a diameter which is substantially equal to the diameter of said tubular fibrous casing when it is filled.

6. A tubular casing according to claim 5, wherein the diameter of said tubular fibrous casing is greater than the diameter of said tubular net prior to stretching of said circumferential threads so that said circumferential threads apply compressive force to said fibrous casing as it is being filled.

7. A tubular casing according to claim 6, wherein the diameter of said fibrous casing is between 2 and 4 times greater than the diameter of said tubular net prior to stretching of said circumferential threads.

8. A tubular casing according to claim 6, wherein the diameter of said tubular net when said circumferential threads become taut is smaller than the diameter of said fibrous casing so that said circumferential and longitudinal threads press inwardly against said fibrous casing.

9. A tubular casing according to claim 4, wherein said fibrous casing is folded flat with at least one pleat so that its width is reduced to fit within said tubular net.

10. A tubular casing according to claim 1, wherein said tubular casing is a knitted tube that is stretchable and impermeable to said food products and longitudinal threads in combination with said circumferential threads, said circumferential and longitudinal threads secured to and spaced, respectively, along and around said knitted tube, said knitted tube being stretchable after said circumferential threads become taut so that said circumferential and longitudinal threads press into a surface of said food product so that a quilted surface pattern is applied to the surface of said food products in contact with said tubular casing.

11. A tubular casing according to claim 10, wherein said circumferential and longitudinal threads are secured to said first tubular portion during knitting of said knitted tube.

12. A tubular casing according to claim 10, wherein said circumferential threads are secured to said knitted tube so as to form a continuous spiral along said knitted tube, said longitudinal threads comprise interlocking loop stitches, each said loop stitch extending between said circumferential threads.

13. A tubular casing according to claim 10, wherein said circumferential and longitudinal threads are secured to an outer surface of said knitted tube.

14. A tubular casing according to claim 7, wherein the diameter of said tubular net when said circumferential threads become taut is smaller than the diameter of said fibrous casing so that said circumferential and longitudinal threads press inwardly against said fibrous casing.

15. A tubular casing according to claim 5, wherein said fibrous casing is folded flat with at least one pleat so that its width is reduced to fit within said tubular net.

16. A tubular casing according to claim 6, wherein said fibrous casing is folded flat with at least one pleat so that its width is reduced to fit within said tubular net.

17. A tubular casing according to claim 7, wherein said fibrous casing is folded flat with at least one pleat so that its width is reduced to fit within said tubular net.

18. A tubular casing according to claim 8, wherein said fibrous casing is folded flat with at least one pleat so that its width is reduced to fit within said tubular net.

19. A tubular casing according to claim 11, wherein said circumferential threads are secured to said knitted tube so as to form a continuous spiral along the length of said knitted tube, said longitudinal threads comprise interlocking loop stitches, each said loop stitch extending between said circumferential threads.

20. A tubular casing according to claim 11, wherein said circumferential and longitudinal threads are secured to the outer surface of said knitted tube.

21. A tubular casing according to claim 12, wherein said circumferential and longitudinal threads are secured to the outer surface of said knitted tube.

22. A tubular casing according to claim 19, wherein said circumferential and longitudinal threads are secured to the outer surface of said knitted tube.

\* \* \* \* \*